US008552668B2

(12) United States Patent
Hogenmueller et al.

(10) Patent No.: US 8,552,668 B2
(45) Date of Patent: Oct. 8, 2013

(54) ARCHITECTURE FOR AUTOMOTIVE ELECTRICAL BODY SYSTEMS

(75) Inventors: Thomas Alfons Hogenmueller, Sunnyvale, CA (US); Vivek Jain, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 1115 days.

(21) Appl. No.: 12/469,093

(22) Filed: May 20, 2009

(65) Prior Publication Data

US 2010/0294750 A1    Nov. 25, 2010

(51) Int. Cl.
*G05D 1/02* (2006.01)
*H04Q 9/00* (2006.01)

(52) U.S. Cl.
USPC ............... 318/16; 318/400.08; 318/400.04; 340/648

(58) Field of Classification Search
USPC ............. 318/16, 470, 400.04, 568.12, 254, 318/430, 432, 434, 620, 400.08; 340/648; 310/239, 68 B; 702/184
See application file for complete search history.

(56) References Cited

U.S. PATENT DOCUMENTS

| | | | |
|---|---|---|---|
| 6,434,512 B1 * | 8/2002 | Discenzo | 702/184 |
| 7,940,019 B2 * | 5/2011 | Wu et al. | 318/400.04 |
| 8,120,503 B2 * | 2/2012 | Mark et al. | 340/648 |
| 2003/0186652 A1 | 10/2003 | Hopf et al. | |
| 2005/0040969 A1 | 2/2005 | Heyn | |
| 2005/0127776 A1 * | 6/2005 | Greene | 310/239 |
| 2007/0164619 A1 * | 7/2007 | Greene | 310/68 B |
| 2009/0267782 A1 * | 10/2009 | Mark et al. | 340/648 |
| 2010/0148709 A1 * | 6/2010 | Wu et al. | 318/400.04 |

FOREIGN PATENT DOCUMENTS

DE    103 38 823 A1    3/2005
EP    1 627 778 A1    2/2006

* cited by examiner

*Primary Examiner* — Paul Ip

(57) ABSTRACT

An automotive electrical body system includes a plurality of electrical assemblies coupled to at least one automotive body component. Each of the assemblies includes a heating element for heating the at least one component, a motor for actuating the at least one component, or a switch configured to toggle the at least one component on and off. Each of the assemblies also includes a wireless communication module for receiving wireless signals, and, in response to the wireless signals, controlling operation of the heating element or motor. An electrical conductor interconnects each of the electrical assemblies and carries electrical power to each of the electrical assemblies.

20 Claims, 11 Drawing Sheets

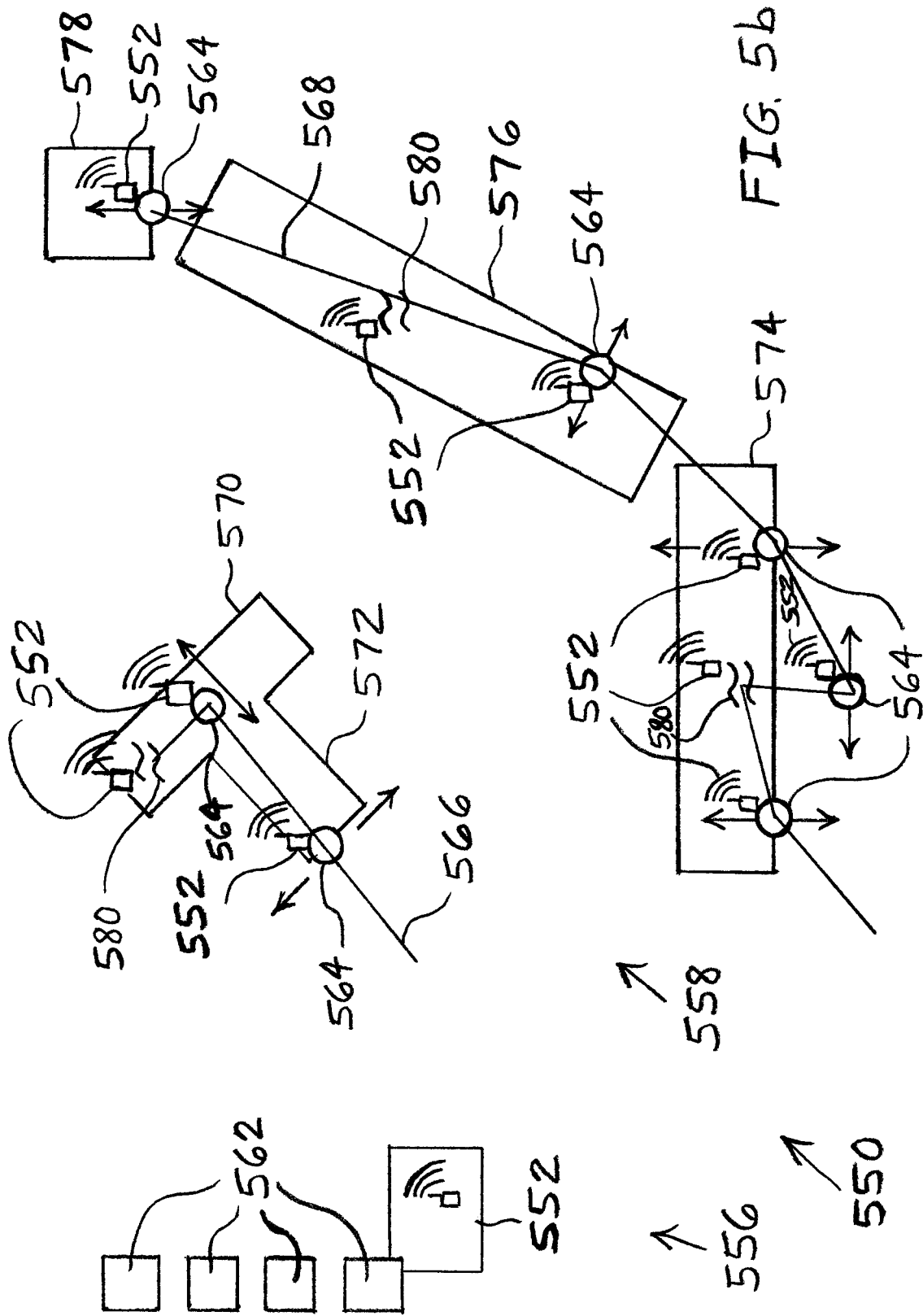

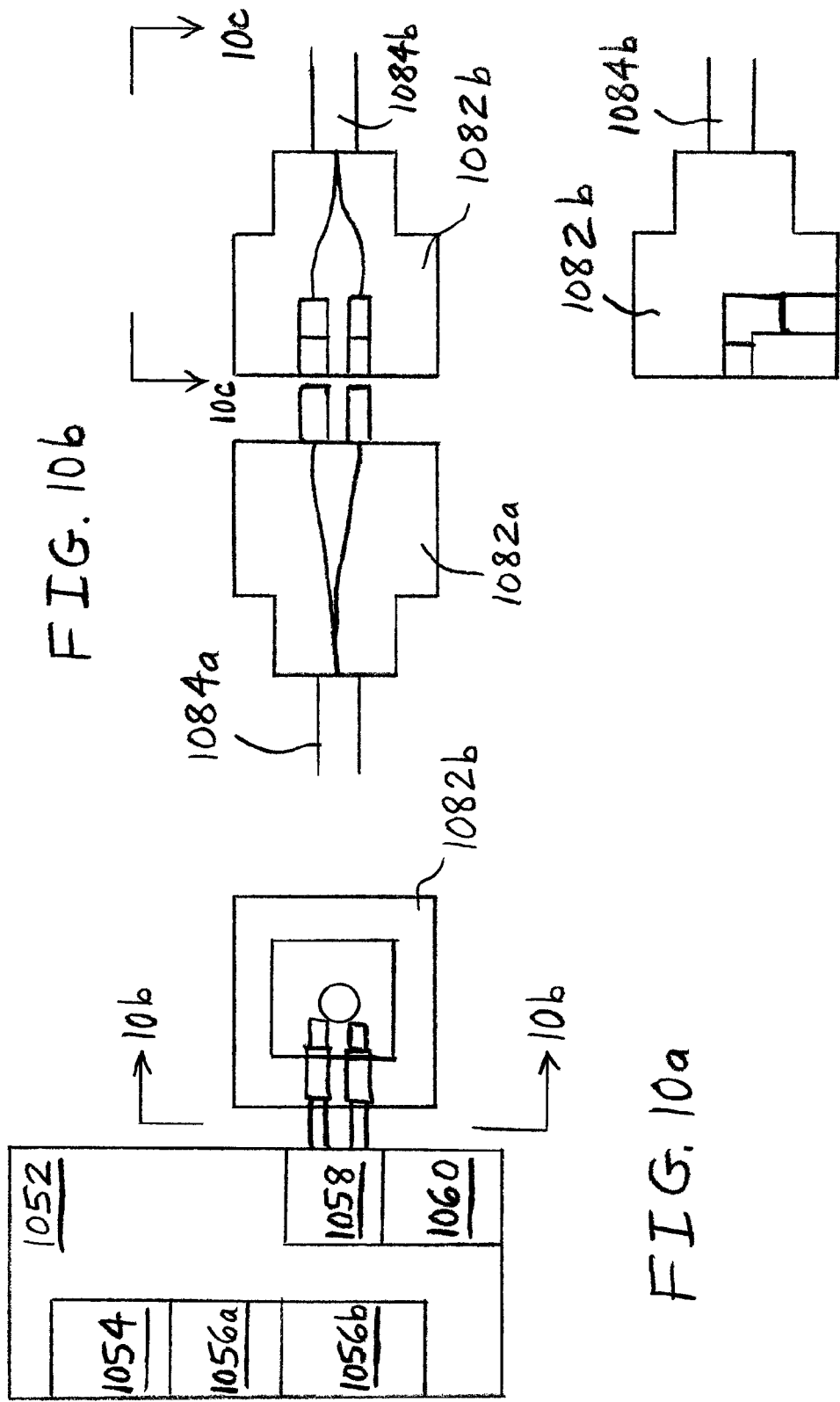

ARCHITECTURE FOR AUTOMOTIVE ELECTRICAL BODY SYSTEMS

BACKGROUND

1. Field of the Invention

The present invention relates to automotive body electrical systems, and, more particularly, to automotive body electrical systems including multiple motors.

2. Description of the Related Art

Typically, automotive body domain applications such as seat control, window lift, mirror adjustment, and light control are distributed over the entire car and are interconnected via field bus communication systems. Current architectures have grown fast over the last decades as more and more convenience functions are introduced to the automotive industry.

The current architectures are hierarchical architectures in which several electronic control units (ECUs) are located near the body domain applications such as the seat ECU under the seat, the door ECU within the door, the ECU for rear light control in the trunk of the car, etc. All these ECUs are interconnected over field bus systems such as the "controller area network" (CAN) field bus, and these ECUs form the first hierarchy of the system. This field bus of the first hierarchy can also be regarded as the backbone network of the body domain.

The ECUs usually consist of a microcontroller and so-called peripheral drivers such as semiconductor switches, relays, signal amplifiers, etc. From the ECUs, several point-to-point wires connect to the peripherals of the applications like the motors (window, lift, seat adjustment), pushbutton panels, heating elements, sensors, etc. The number of these peripherals is constantly increasing for each application. For example, fifteen years ago a comfort seat had only three motors to move the seat forward and backward, to adjust the backrest, and to adjust the height. However, current seats may have about fifteen motors for additional functions such as air ventilation, massage functions, etc.

In order to connect the peripherals, a large number of cables may be necessary, which increases the complexity of the cable harness, increases the weight of the car, and increases the costs of the car. The increase in the number of cables may also lead to reliability problems in areas where the cable harness is mounted on moveable parts such as the side mirror, doors, seat, etc. Hence, in known architectures a second hierarchy order in the form of a so-called "subsystem" may be provided. Subsystems may have their own wired communication network which is usually a low cost communication system such as a local interconnect network (LIN). In contrast to the backbone, these networks are usually master-slave systems and not multimaster systems. The ECU that has access to the backbone is usually the master and the peripherals are the slaves. The ECU is also the gateway between the backbone and the subsystem.

The state-of-the-art of automotive electronics is progressing rapidly and it is projected that electronics alone will make up forty percent of the total cost of future cars. All these electronic units in the vehicle are connected through different bus systems depending on the application requirements. Typically, a hierarchical body domain automotive network 100 (FIG. 1) consists of several sub-networks, such as sub-networks 112, 114, connected together to form a larger network. The sub-networks technology being used is, for instance, a Local Interconnect Network (LIN). Each sub-network consists of a gateway node or ECU 116 and some sensor/actuator nodes 118. Network 100 may include a wired backbone 120 compatible with a Controller Area Network (CAN), FlexRay, Ethernet, etc. Network 100 may also include a body computer 124 and wired communication links 122 compatible with a CAN, Local Interconnect Network (LIN), FlexRay, Ethernet, etc.

ECUs 116 may be interconnected with each other over wired backbone field bus systems 120. Peripherals 118 may be directly connected to ECUs 116. Peripherals 118 may include tiny electronics and may communicate over another field bus with the main ECU. Thus, ECUs 116 may function in such architecture as gateways which communicate on one end with network backbone 120 and on the other end with the local sub-networks. The sub-networks may be organized in master-slave relationships in which the ECU is the master for the distributed tiny electronics in peripherals 118.

A problem associated with the architecture of FIG. 1 is that it has poor reliability. For example, if one of the ECUs fails, then the entire associated subsystem is no longer able to operate. Another problem is that there may be long time delays for end-to-end communication as gateways become bottlenecks. Yet another problem is that modularity and scalability are limited by the underlying sub-network systems.

What is neither disclosed nor suggested in the art is an automotive body domain architecture that avoids the above-mentioned problems and disadvantages.

SUMMARY OF THE INVENTION

The present invention provides novel electrical/electronic architectures for automotive body domain systems including wireless communication technology and novel wiring schemes for cable harnesses. The hierarchical architecture of ECUs with satellite peripherals is replaced by a distributed control electronic approach which reduces the complexity and the quantity of cable harnesses. The invention also provides new cabling architectures and partitioning of mechanical and electronic components.

The present invention may be applicable for automotive networks as well as for other applications. For example, the principles of the present invention may be applied to industrial networks, cargo, airplanes, ships, etc.

The invention comprises, in one form thereof, an automotive electrical body system including a plurality of electrical assemblies coupled to at least one automotive body component. Each of the assemblies includes a heating element for heating the at least one component, a motor for actuating the at least one component, or a switch configured to toggle the at least one component on and off. Each of the assemblies also includes a wireless communication module for receiving wireless signals, and, in response to the wireless signals, controlling operation of the heating element or motor. An electrical conductor interconnects each of the electrical assemblies and carries electrical power to each of the electrical assemblies.

The invention comprises, in another form thereof, an actuator system including a motor assembly having a shaft carrying a coil and a commutator. At least one brush is associated with the commutator. A sensor senses a rotational position of the shaft, coil and/or commutator. A wireless communication module is connected to the sensor and to the at least one brush. The module receives wireless signals and transmits drive signals to the at least one brush dependent upon the wireless signals and upon signals received from the sensor. A housing contains each of the motor assembly and the communication module.

The invention comprises, in yet another form thereof, an actuator system including a motor assembly having a shaft carrying a coil and a commutator. Two brushes are associated with the commutator. A sensor senses a rotational position of the shaft, coil and/or commutator. At least one sensor terminal is electrically connected to the sensor. First and second brush terminals are each electrically connected a respective one of the two brushes. A wireless communication module includes a radio receiver for receiving wireless signals. A microcontroller is electrically connected to the at least one sensor terminal and receives signals from the sensor. A brush driver circuit is electrically connected to the first and second brush terminals. The brush driver circuit transmits drive signals to the first and second brushes dependent upon the wireless signals and upon the signals received from the sensor.

An advantage of the present invention is that the architecture provides superior flexibility, scalability, cost efficiency, and expandability.

Another advantage is that the wireless architecture is simpler than known wired architectures.

Yet another advantage is that, for the body domain systems, only a single communication system is used, which reduces the hierarchical problems of known systems.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 5b is a schematic diagram of one embodiment of an automotive body domain architecture of the present invention.

FIG. 10a is a block diagram of a wireless distributed peripheral module connected to a pair of Y-connectors according to one embodiment of the invention.

FIG. 10b is a schematic diagram of the pair of Y-connectors of FIG. 10a along lines 10b-10b.

FIG. 10c is a schematic diagram of one of the Y-connectors of FIG. 10b along lines 10c-10c.

Figure 1:
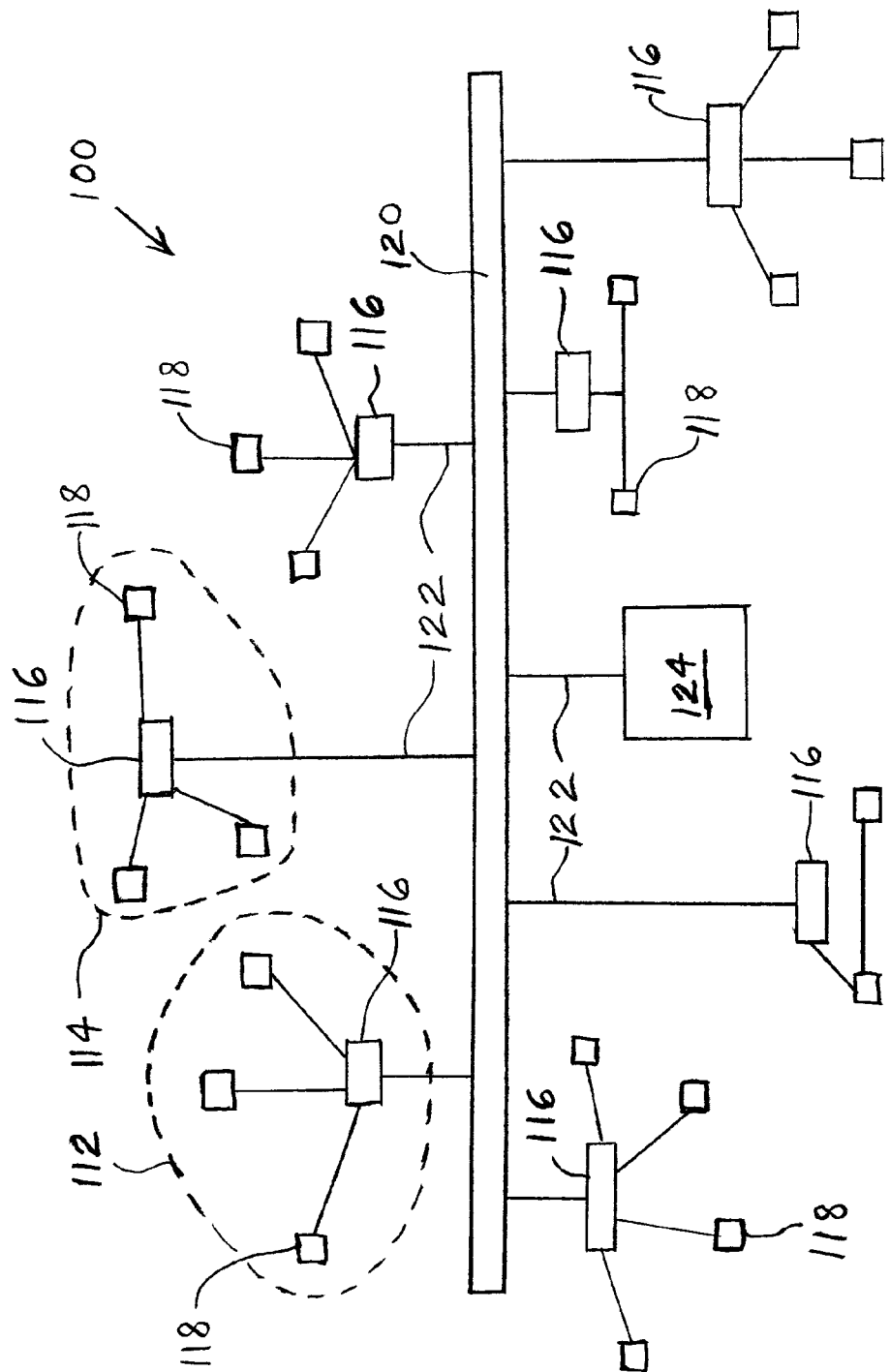
FIG. 1 is a block diagram of a wired hierarchical body domain automotive network architecture of the prior art.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 2:
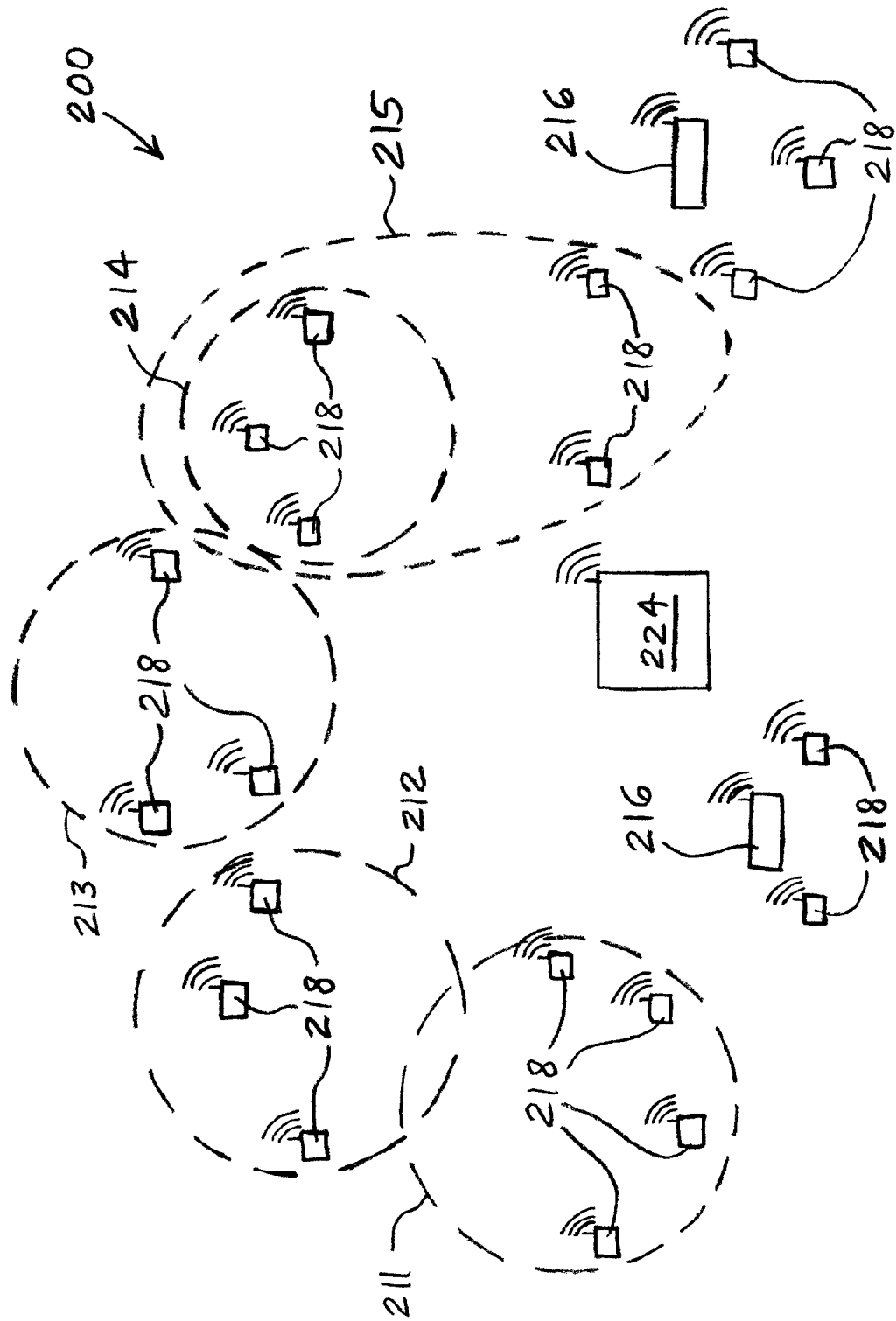
FIG. 2 is a block diagram of one embodiment of a network architecture of the present invention including a wireless communication system.

Referring now to FIG. 2, there is shown an automotive network 200 of the present invention which may circumvent the problems of the prior art by using wireless communication. Network 200 includes sub-networks 211-215 which may each represent a different class of peripherals 218. For example, sub-networks 211-215 may be clusters of pushbutton panels, lights, sensors, small electric motors, and actuator components, respectively. There may be some overlap between sub-networks. For example, the small electric motor sub-network 214 may be a subset of the larger actuator component sub-network 215, as shown in FIG. 2.

Wireless gateway ECUs 216 may communicate wirelessly, such as via radio frequency communication, with wireless sensor/actuator nodes 218 within the sub-network of each gateway ECU 216. A body computer 224 may be in direct wireless communication with peripherals 218 in sub-networks 211-215, and may communicate via the ECUs 216 with peripherals 218 that have the ECU 216 in their sub-network.

A novel aspect of the invention is that only one wireless communication system may be used for the entire body domain. As is evident from FIG. 2, ECUs 216 may be largely eliminated. In other embodiments, ECUs may be completely eliminated. In the absence of ECUs, the actuator, sensors, and pushbutton panels may have very small electronics with a wireless communication interface (e.g., a wireless distributed peripheral module (wDPM)). A novel combination provided by the invention includes using only a single communication interface for the body domain, replacing centrally-organized ECUs with non-centralized wDPMs, and use of the new communication pattern in which peripherals may communicate directly instead of using an ECU as an intermediary.

As advances in wireless communication technology enable seamless communication on different frequencies (e.g., frequency multiplexing), completely new communication schemes can be applied, some of which schemes may be described in a U.S. patent application filed even date herewith, entitled "Dynamic Function Slot Assignment in Intra-Vehicular Wireless Networks", having inventors Thomas Hogenmueller and Vivek Jain, which is hereby incorporated by reference herein in its entirety.

In general, certain aspects of the invention focus on the architecture, anatomy and hardware compilation of the so-called wireless distributed peripheral modules. One cost efficient and flexible embodiment of the invention may use wDPMs for multiple applications, and so a set of generic wDPMs with different features and sizes may be provided. As described above with reference to FIG. 2, in body domain applications, the peripherals may be clustered in a few categories regarding the necessary peripheral drives. These clusters may include, for example, pushbutton panels, small electrical motors, lights and sensors.

Figure 3:
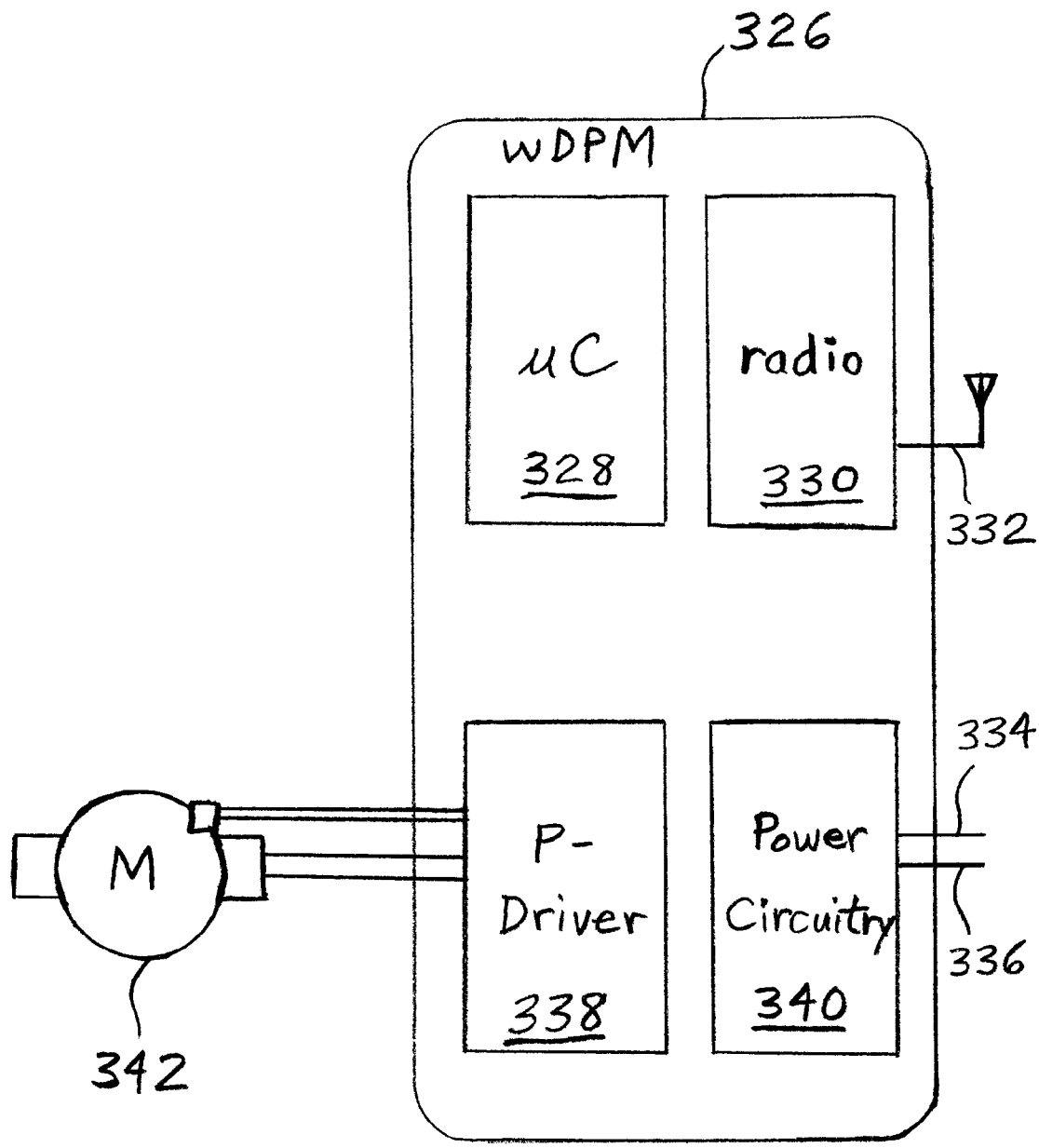
FIG. 3 is a block diagram of one embodiment of a wireless distributed peripheral module that may be used in a network of the present invention.

In one embodiment, each cluster includes only one generic type of wDPM. The kernel of a wDPM 326 (FIG. 3) may be a microcontroller 328 and a communication interface (e.g., radio) 330 having an antenna 332. The only wires that may go into wDPM 326 may be the two power cables 334, 336. Different types of wDPMs may be distinguished from each other by their type of peripheral driver 338 and the capacity of the power supply 340. Peripheral driver 338 may drive a motor 342.

Figure 4:
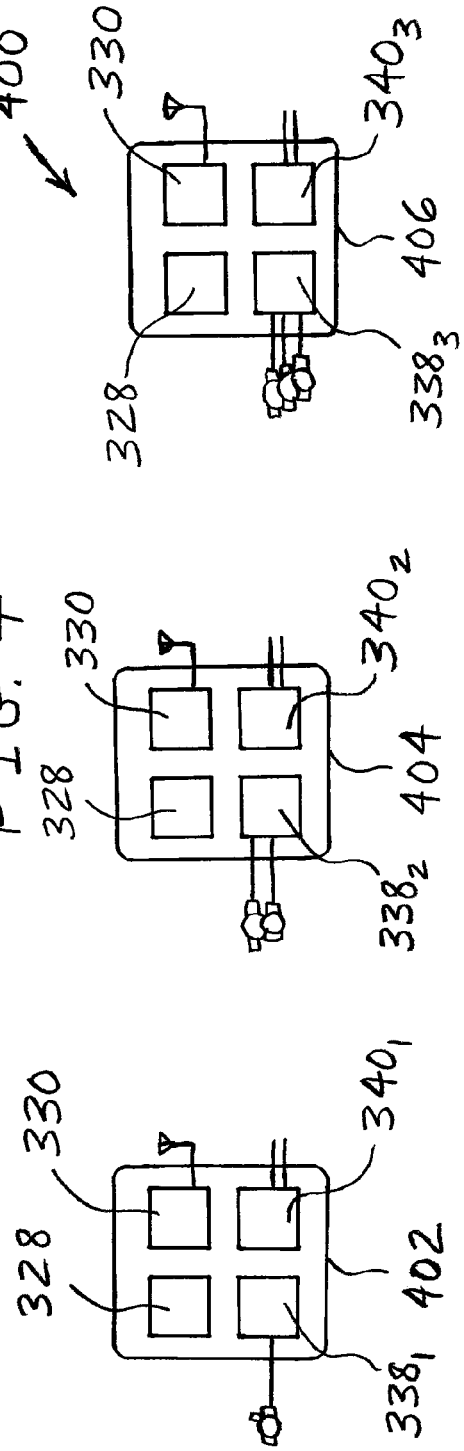
FIG. 4 is a block diagram of a generic wireless distributed peripheral module set that may be used in a network of the present invention.
Figure 4:
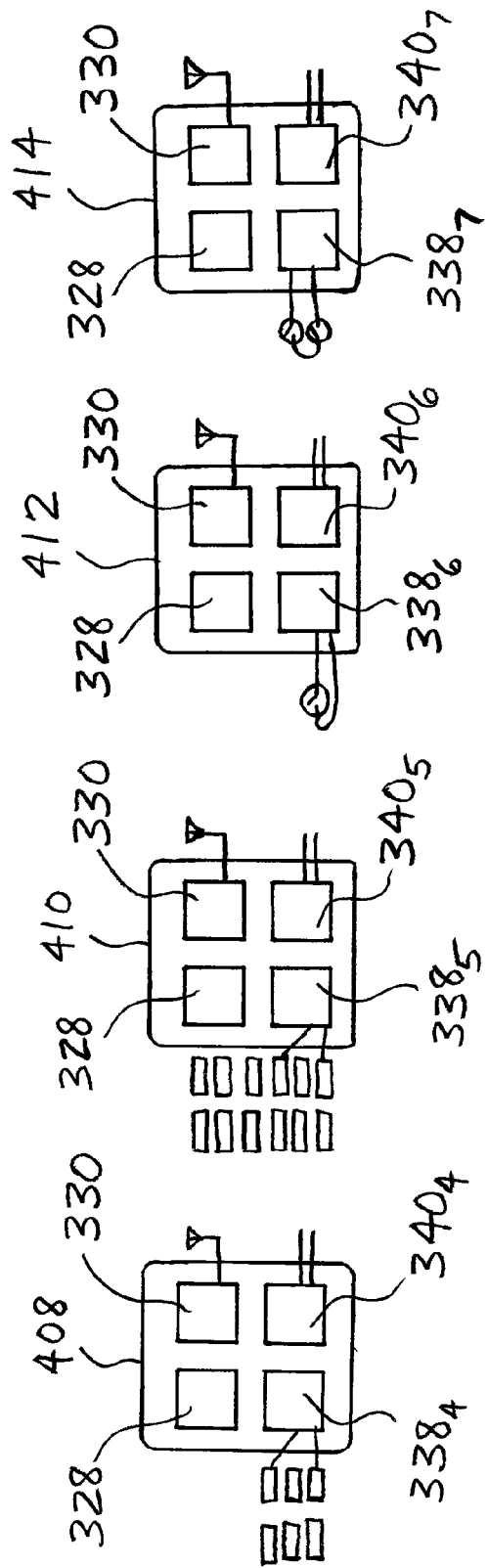

For the different types of peripheral clusters, as described above, different generic types of wDPMs may be provided. All the different types of wDPMs may form a set. To build up complete systems, several wDPMs may be used from a wDPM set. One example of such a generic wDPM set 400 is illustrated in FIG. 4. Set 400 includes: motor wDPMs 402, 404, 406 of three different types, accommodating one, two and three motors, respectively; pushbutton wDPMs 408, 410 of two different types, accommodating six and twelve pushbuttons, respectively; and switch wDPMs 412, 414 of two different types, accommodating one and two switches, respectively.

Figure 5A:
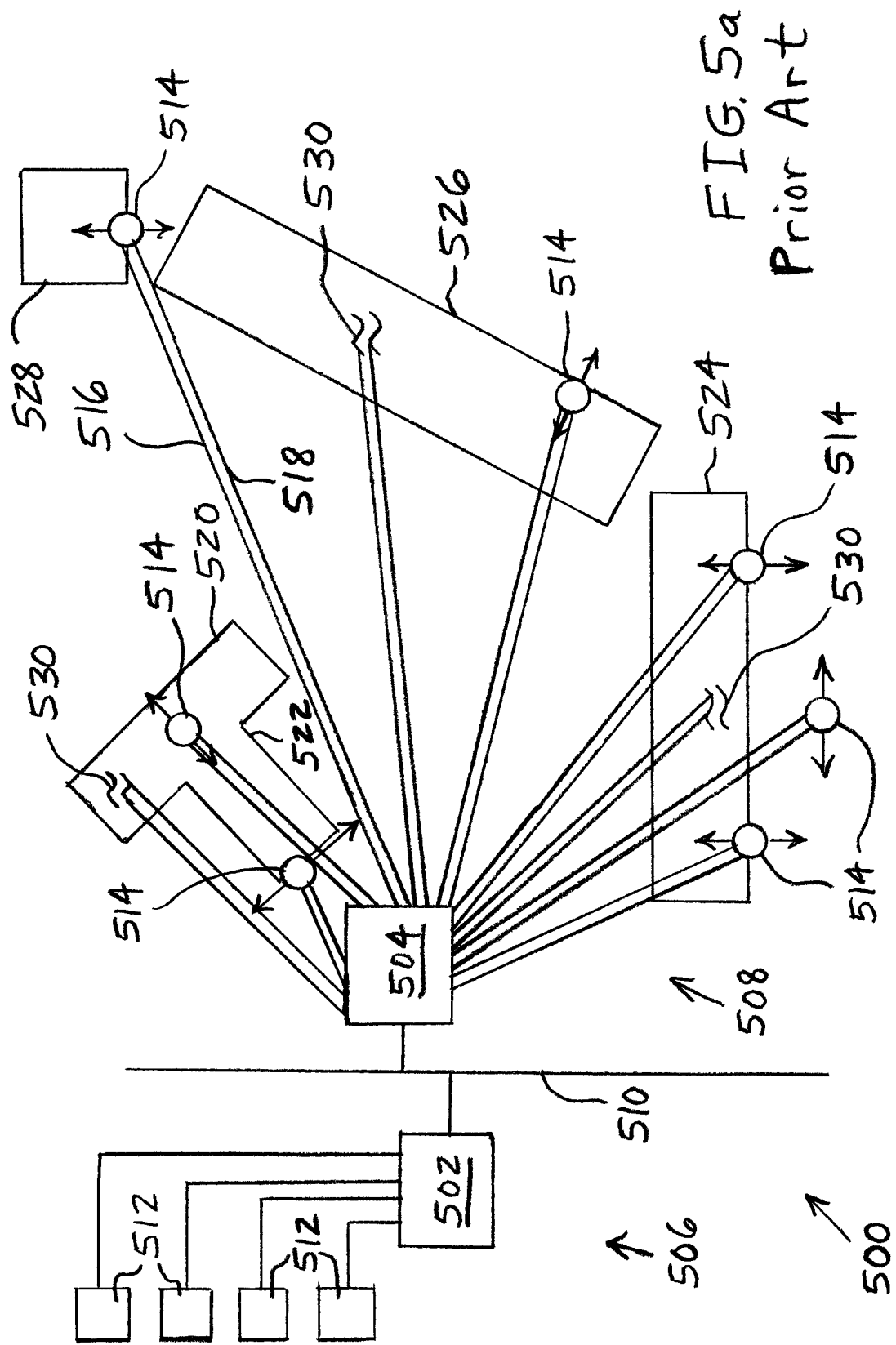
FIG. 5a is a schematic diagram of a prior art automotive body domain architecture.

FIG. 5a illustrates a known automotive body domain architecture 500 including central ECUs 502, 504 of a door module 506 and a seat module 508, respectively. ECUs 502, 504 are interconnected by a body CAN 510. Dedicated wires run to the various actuators, such as pushbuttons 512 and DC engines (i.e., motors) 514 with Hall sensors. There are four wires connected to each motor 514. Specifically, two wires are provided in a power cable 516 for powering the motor, and two wires are provided in a communication cable 518 for connection to the Hall sensor to measure the revolution of motor 514. Motors 514 are provided in both steering elements 520, 522 and in seat elements 524, 526, 528. Heaters 530 are provided in steering element 520 and in seat elements 524, 526. For each of cables 516, 518 there are at least two connectors, i.e., one connector for connection to the ECU and another connector for connection to the motor/heater.

FIG. 5b illustrates a wDPM-based automotive body domain architecture 550 of the present invention including decentralized wDPMs 552 instead of centralized ECUs in a door module 556 and a seat module 558. The only wiring needed is two power cables 566, 568. Each wDPM 552 is associated with the pushbuttons 562, a motor 564 or a heater 580. Each motor 564 may have a Hall sensor to measure the revolution of motor 564 and to communicate the motor position to the associated wDPM 552. Motors 564 are provided in both steering elements 570, 572 and in seat elements 574, 576, 578. Heaters 580 are provided in steering element 570 and in seat elements 574, 576.

The wDPM 552 associated with pushbuttons 562 may communicate with the wDPMs 552 associated with seat module 558. In response to inputs from a user interface, such as a user manually pressing at least one of pushbuttons 562, the wDPM 552 associated with pushbuttons 562 may wirelessly transmit a command signal to at least one of the wDPMs 552 associated with seat module 558. The command signal may instruct the receiving wDPM 552 to actuate its associated motor 564 or apply power to, or take power from, its associated heater 580.

Although architecture 550 does not require point-to-point wiring, architecture 550 may possibly include point-to-point wiring. Architecture 550 may be wired with DC bus structure cabling similar to light chains in which there are only two power lines provided, which each extend from the first actuator to the last actuator. Each of the actuators between the first and last actuators may be connected to the power lines with connectors that cut through the insulation of the power lines to thereby make connection with the electrical conductors, but which do not require that the electrical conductors be cut or be provided with any discontinuity. Examples of such non-invasive connectors are so-called cut clamps or flex foil connections. A mechanical fixation element may be provided to hold the power lines motionless relative to, and in the vicinity of, the connectors in order to maintain the electrical connection between the connectors and the electrical conductors. Advantageously, this electrical connection scheme reduces the number of wires and connectors used as compared with the known architecture 500.

Figure 6:
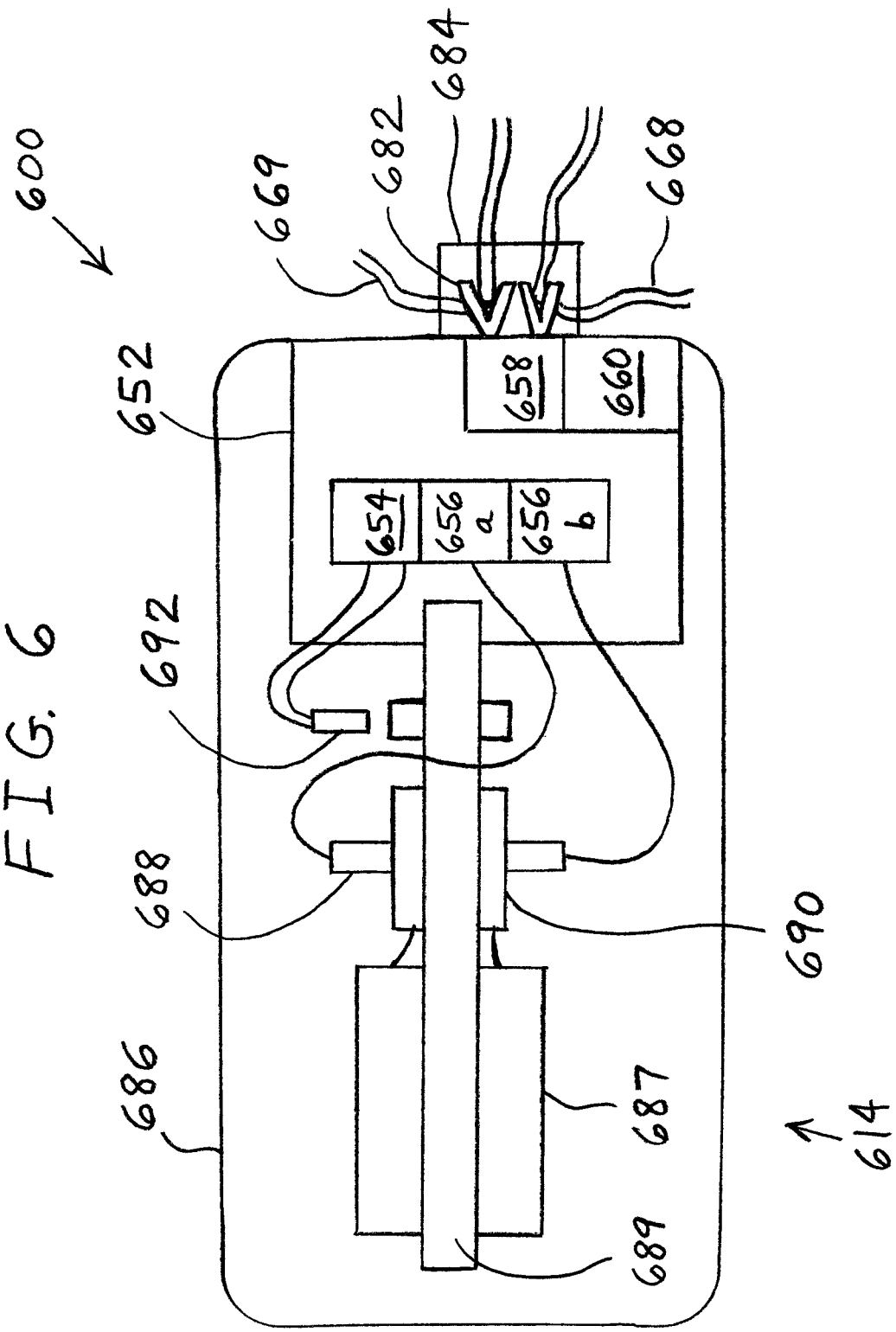
FIG. 6 is a block diagram of one embodiment of a mechatronic system of the present invention.

FIG. 6 illustrates one embodiment of a mechatronic system 600 of the present invention including a motor 614, a wDPM 652, and a non-invasive connector 682 such as a cut clamp or flex foil connection having a mechanical fixation element 684 for holding DC-bus wires 668, 669. Motor 614 includes a housing 686, coil 687, a pair of brushes 688 disposed in a carrier, shaft 689, commutator 690 and Hall sensor 692. Hall sensor 692 may sense the rotational position of coil 687, shaft 689 and/or commutator 690. Motor DPM 652 includes a microcontroller 654, H-bridge drivers 656a-b, power supply 658 and radio 660.

Wireless DPM 652 may receive wireless signals via radio 660 from an external source, such as a wDPM associated with pushbuttons and/or switches of a door module. Wireless DPM 652 may transmit drive signals to brushes 688 via H-bridge drivers 656a-b. The drive signals may be dependent upon the external wireless signals and upon signals received from Hall sensor 692.

In general, a mechatronic system is an efficient combination of electronic and mechanical components. An advantage of mechatronic system 600 is that a single housing may be used for both motor 614 and wDPM 652, thus saving the cost and space of a second housing.

As the electronics of a wDPM are very small, another way to conserve housing material and space is for the wDPM to be disposed inside the connector. One benefit of using wireless technology is the limited number of connectors that are needed. A novel feature of system 600 is that an antenna of radio 660 may be integrated into the connector.

Because the use of wDPM is a revolutionary approach for the automotive industry, and the continued use of known motor designs may be desired in some applications, the present invention also provides inventive arrangements for easing the industry's transition from known systems to wDPM-based systems. As background information, electronics, actuators and cable harnesses are usually provided by different supplier companies. However, sometimes the actuator and the electronics are provided by the same supplier. In other cases, electronics, actuators and cable harnesses are provided by single supplier. It may be the case that the automobile manufacturer (OEM) wants to continue to use a particular known motor design, and thus a wDPM-based connector must be compatible with the terminals of the known motor.

Figure 7:
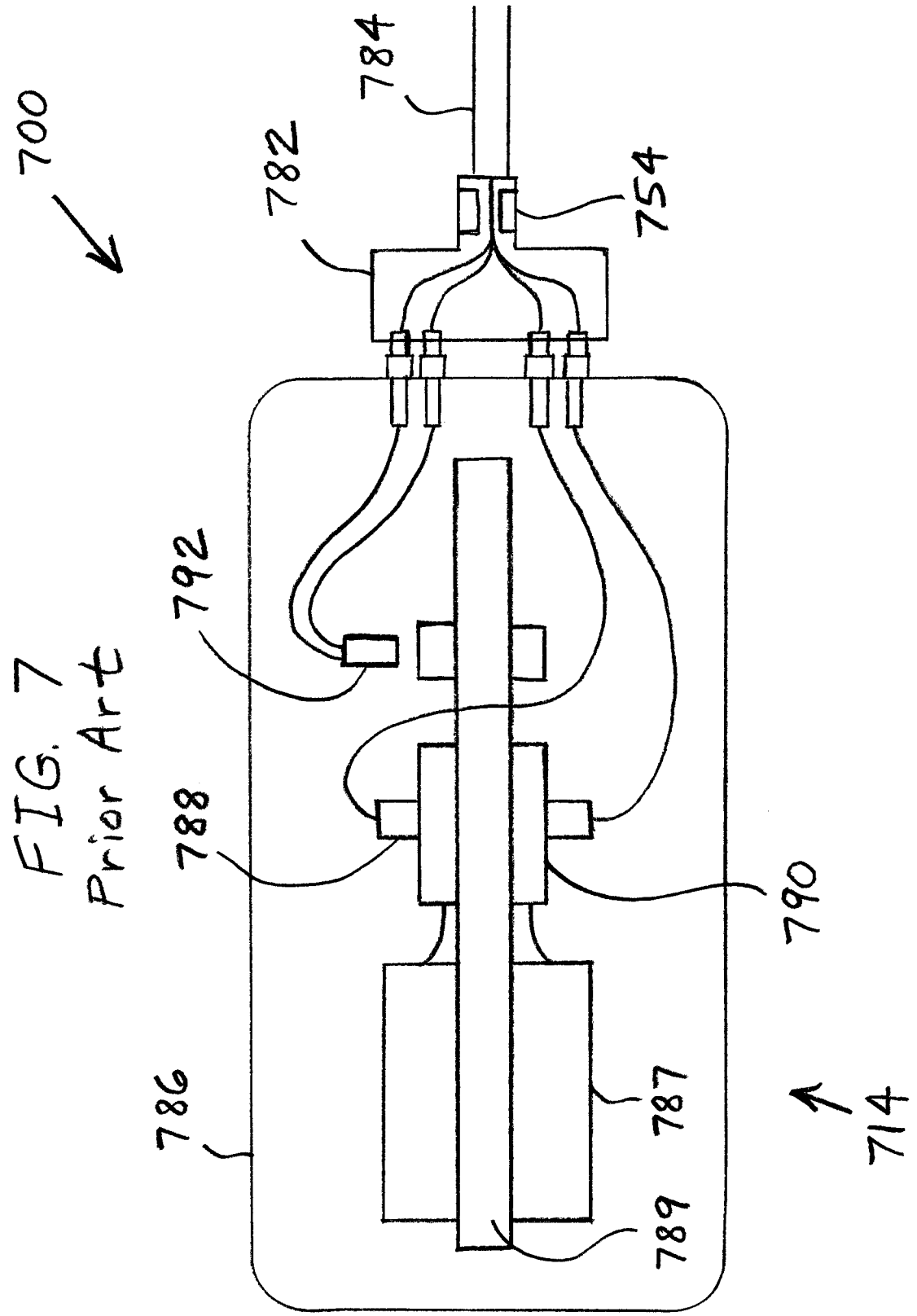
FIG. 7 is a block diagram of a portion of a known actuator architecture of the prior art.

A portion of a known actuator architecture 700 is illustrated in FIG. 7 including a motor 714, a customized connector 782, and a cable 784. Motor 714 includes a housing 786, coil 787, a pair of brushes 788 disposed in a carrier, shaft 789, commutator 790 and Hall sensor 792. Hall sensor 792 may sense the rotational position of coil 787, shaft 789 and/or commutator 790. Connector 782 includes a cord grip 754. Cable 784 may connect to an ECU (not shown). The OEM can choose the motor, cable harness and ECUs. There is no standard connector or motor interface (Hall sensor). Architecture 700 may include discrete cabling from point-to-point.

Figure 8:
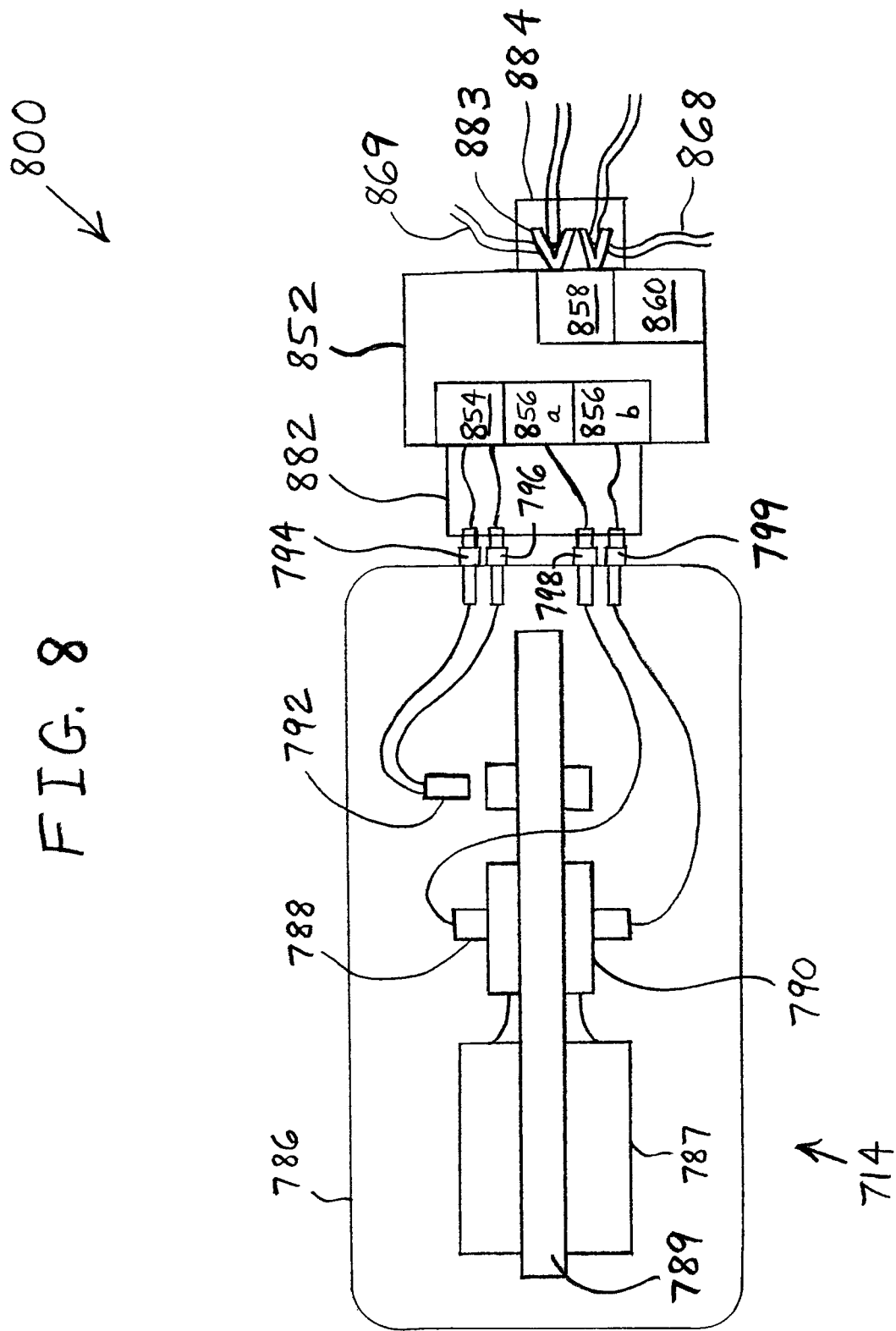
FIG. 8 is a block diagram of a portion of an actuator architecture of the present invention including a known motor, a customized connector, a wireless distributed peripheral module, and a non-invasive electrical connector.

A portion of an actuator architecture 800 of the present invention is illustrated in FIG. 8 including a known motor 714 having terminals 794, 796 electrically connected to Hall sensor 792, and terminals 798, 799 each electrically connected to a respective one of the two brushes 788. Architecture also includes a customized connector 882, a wDPM 852, and a non-invasive connector 883 such as a cut clamp or flex foil connection having a mechanical fixation element 884 for holding DC-bus wires 868, 869. Motor DPM 852 includes a microcontroller 854, H-bridge drivers 856a-b, power supply 858 and radio 860. Microcontroller 854 may be electrically connected to terminals 794, 796. H-bridge drivers 856a-b may be electrically connected to terminals 798, 799, respectively. Radio 860 may include an antenna incorporated into connector 882, or into a housing containing wDPM 852.

Wireless DPM 852 may receive wireless signals via radio 860 from an external source, such as a wDPM associated with pushbuttons and/or switches of a door module. Wireless DPM 852 may transmit drive signals to brushes 788 via H-bridge drivers 856a-b. The drive signals may be dependent upon the external wireless signals and upon signals received from Hall sensor 792.

Figure 9:
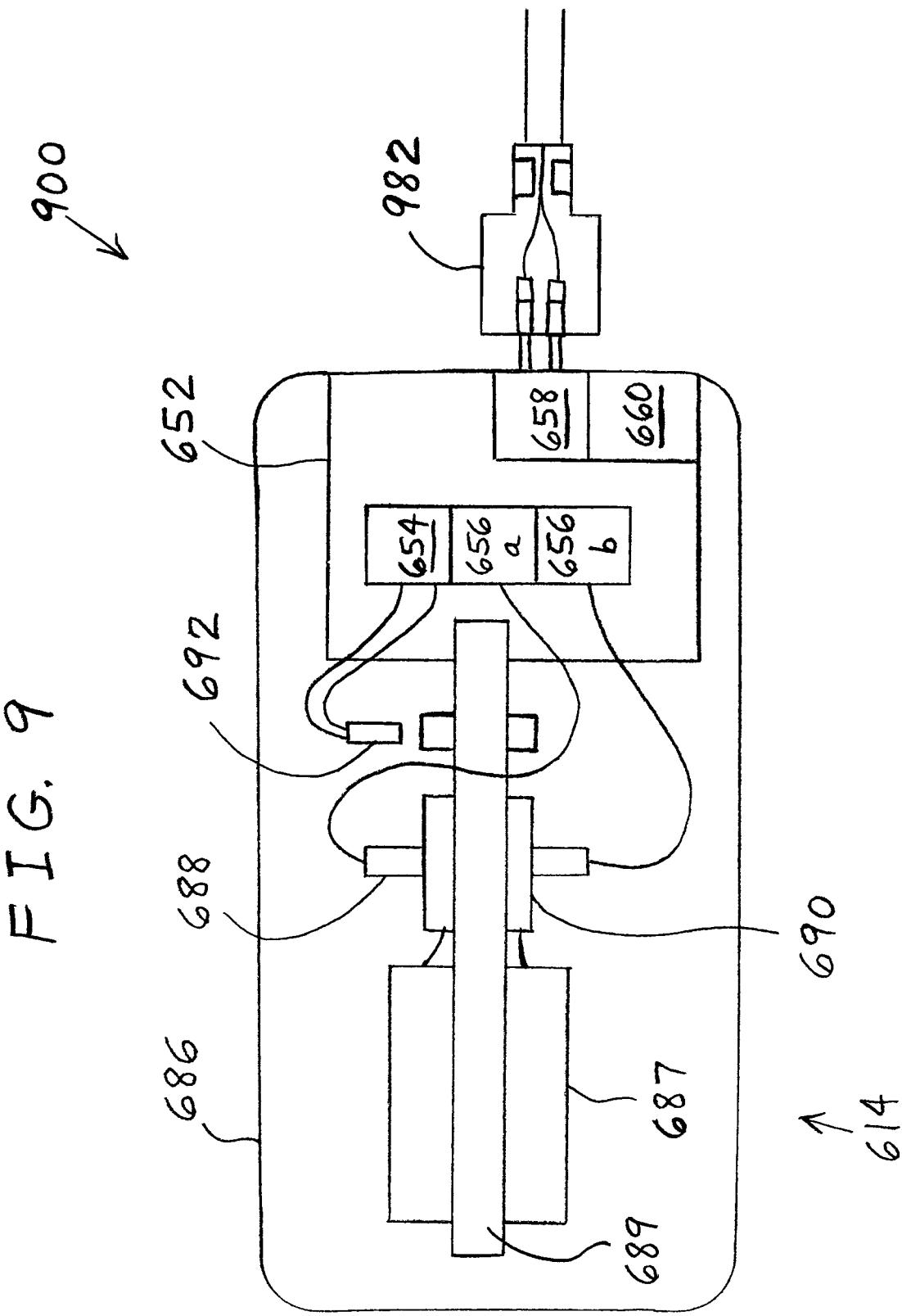
FIG. 9 is a block diagram of a portion of another actuator architecture of the present invention including a motor and a wireless distributed peripheral module in a single housing.

A portion of another actuator architecture 900 of the present invention is illustrated in FIG. 9 including the mechatronic combination of motor 614 and wDPM 652 in a single housing 686. A customized or standardized connector 982 is connected to power supply 658. The point-to-point connections of the discrete cable harness structure enables the mechatronic combination of motor 614 and wDPM 652 of the invention to be mixed with standard motors, such as motor 714, in the same architecture 900.

An advantage of architecture 900 over a conventional motor and ECU is that at least two cables per actuator as well as the ECU are eliminated. Another advantage of the mechatronic combination of motor 614 and wDPM 652 along with connector 982 is that it can be used to quickly and easily expand, or add on to, an existing conventional architecture that includes ECUs and point-to-point wiring. Thus, new functionality may be added to existing systems, possibly as an after market product.

As mentioned above, bus cabling may be an efficient way of implementing wDPMs. FIGS. 10a-c illustrate one embodiment of such bus cabling including Y-connectors instead of cut clamps as shown in FIGS. 6 and 8. This cabling architecture may the harness to be expanded as needed in a chain of actuators.

Motor wDPM 1052 includes a microcontroller 1054, H-bridge drivers 1056a-b, power supply 1058 and radio 1060. A pair of Y-connectors 1082a-b interconnect cables 1084a-b as well as the terminals of power supply 1058.

In one embodiment, the invention comprises a method of providing an automotive electrical body system. In a first operation, at least one body component is provided in a vehicle, such as a car, boat, plane, train, etc. The body component may be anything physical device that may be actuated, heated, or, more generally, caused to undergo any type of transformation. In specific embodiments, the body component is a car seat or a steering wheel. The transformation may be, for example, mechanical, electrical, chemical, or a combination of the above.

In a next operation, a plurality of electrical assemblies are coupled to the at least one body component. Each of the assemblies includes a heating element, a motor, or a switch. In the case of a heating element, the heating element may heat the component, such as the steering wheel or car seat. It is also possible that the heating element may heat some substance in the component, such as to initiate a chemical reaction. In the case of a switch, the switch may turn on or turn off a light. In the case of a motor, the power may be applied to the motor to cause the motor to move some component, or at least some part of the component. For example, the motor may move a steering wheel closer to or farther away from a driver, or may raise or lower the base of the steering wheel. In the case of a car seat, the motor may raise or lower the base of the car seat; move the base of the car seat forward or backward; rotate the back of the car seat in clockwise or counterclockwise directions; lower or raise the head rest; control air ventilation, or control a massage function. In another embodiment, the motor may raise or lower a car door window.

In another operation, a wireless communication module may be connected to the heater or motor. The wireless communication module may receive external wireless signals, such as from another wireless communication module that is connected to a user interface. The user interface may include pushbuttons or switches, and may be installed on a door of the car. For instance, the user may want to apply heat to the steering wheel or seat, or may want to adjust the position of the rearview mirror or seat. Thus, the user may push a button or press a switch, which may cause wireless command signals to be sent to the wireless communication module that is associated with the motor or heating element.

In another operation, in response to the wireless signals, the wireless communication module may control operation of the heating element or motor. That is, the wireless communication module may apply power to, or remove power from, the heating element or motor to thereby apply or remove heat, or adjust a position of the motor. The wireless communication module may receive signals from the Hall sensor of the motor such that a microcontroller of the wireless communication module may determine a current position of the motor.

In another operation, an electrical conductor, such as a power cable, may be used to interconnect each of the electrical assemblies and carry electrical power to each of the electrical assemblies.

The invention has been described herein as being applicable to body domain systems within automobiles, buses, trucks, etc. However, in other embodiments, the invention is applicable to other domains within a vehicle, such as power train and chassis control, for example.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An actuator system, comprising:
   a motor assembly including:
      a shaft carrying a coil and a commutator;
      at least one brush associated with the commutator; and
      a sensor configured to sense a rotational position of at least one of the shaft, coil and commutator;
   a wireless communication module connected to the sensor and to the at least one brush, the module being configured to:
      receive wireless signals; and
      transmit drive signals to the at least one brush dependent upon the wireless signals and upon signals received from the sensor; and
   a housing containing each of the motor assembly and the communication module.

2. The system of claim 1 further comprising at least one automotive body component, the motor being configured to actuate the at least one automotive body component.

3. The system of claim 2 wherein the at least one automotive body component comprises at least one of a steering wheel and a car seat.

4. The system of claim 1 further comprising an external wireless communication module configured to transmit the wireless signals in response to inputs from a user interface.

5. The system of claim 1 further comprising an electrical conductor connected to the wireless communication module and configured to carry electrical power to the wireless communication module, the electrical conductor being connected to the wireless communication module via one of a cut clamp, a flex foil connection, and a Y-connector.

6. The system claim 5 wherein the electrical conductor comprises DC-bus wires.

7. The system claim 6 further comprising a mechanical fixation element holding the DC-bus wires fixed in the area of the wireless communication module.

8. The system of claim 1 wherein the at least one brush comprises a plurality of brushes, the wireless communication module including:
a microcontroller connected to the sensor; and
a plurality of H-bridge drivers, each of the H-bridge drivers being connected to a respective one of the brushes.

9. An actuator system, comprising:
a motor assembly including:
a shaft carrying a coil and a commutator;
two brushes associated with the commutator;
a sensor configured to sense a rotational position of at least one of the shaft, coil and commutator;
at least one sensor terminal electrically connected to the sensor; and
first and second brush terminals each electrically connected a respective one of the two brushes; and
a wireless communication module including:
a radio receiver configured to receive wireless signals;
a microcontroller electrically connected to the at least one sensor terminal and configured to receive signals from the sensor; and
a brush driver circuit electrically connected to the first and second brush terminals, the brush driver circuit being configured to transmit drive signals to the first and second brushes dependent upon the wireless signals and upon the signals received from the sensor.

10. The system of claim 9 further comprising at least one automotive body component, the motor being configured to actuate the at least one automotive body component.

11. The system of claim 10 wherein the at least one automotive body component comprises at least one of a steering wheel and a car seat.

12. The system of claim 9 further comprising an external wireless communication module configured to transmit the wireless signals in response to inputs from a user interface.

13. The system of claim 9 further comprising an electrical conductor connected to the wireless communication module and configured to carry electrical power to the wireless communication module, the electrical conductor being connected to the wireless communication module via one of a cut clamp, a flex foil connection, and a Y-connector, the wireless communication module including a connector housing containing the microcontroller, bridge driver circuit, radio receiver, and an antenna of the radio receiver.

14. An actuator system, comprising:
a motor assembly including:
an electrical input;
a shaft; and
a sensor configured to sense a rotational position of the shaft; and
a wireless communication module connected to the sensor and to the electrical input, the module being configured to:
receive wireless signals; and
transmit drive signals to the electrical input dependent upon the wireless signals and upon signals received from the sensor.

15. The system of claim 14 further comprising at least one automotive body component, the motor assembly being configured to actuate the at least one automotive body component.

16. The system of claim 15 wherein the at least one automotive body component comprises at least one of a steering wheel and a car seat.

17. The system of claim 14 further comprising an external wireless communication module configured to transmit the wireless signals in response to inputs from a user interface.

18. The system of claim 14 further comprising an electrical conductor connected to the wireless communication module and configured to carry electrical power to the wireless communication module, the electrical conductor being connected to the wireless communication module via one of a cut clamp, a flex foil connection, and a Y-connector.

19. The system claim 18 wherein the electrical conductor comprises DC-bus wires, the system further comprising a mechanical fixation element holding the DC-bus wires fixed in the area of the wireless communication module.

20. The system claim 14 further comprising a housing containing each of the motor assembly and the communication module.

* * * * *